(12) United States Patent
Wang et al.

(10) Patent No.: US 12,107,680 B2
(45) Date of Patent: Oct. 1, 2024

(54) MONITORING BURST ERRORS IN FORWARD ERROR CORRECTION FRAMES

(71) Applicant: Equinix, Inc., Redwood City, CA (US)

(72) Inventors: Qiang Wang, San Carlos, CA (US); Pradeep Swargam, San Jose, CA (US); Balakrishnan Sridhar, Ellicott City, MD (US); Iwan Kartawira, San Jose, CA (US); Manveer Singh, Tracy, CA (US); Mohan Rao G. Lingampalli, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 17/820,456

(22) Filed: Aug. 17, 2022

(65) Prior Publication Data

US 2024/0097821 A1     Mar. 21, 2024

(51) Int. Cl.
*H04L 1/00*        (2006.01)
*H04B 10/40*    (2013.01)

(52) U.S. Cl.
CPC .......... *H04L 1/0076* (2013.01); *H04B 10/40* (2013.01); *H04L 1/0041* (2013.01)

(58) Field of Classification Search
CPC ...... H04L 1/0076; H04L 1/0041; H04B 10/40
See application file for complete search history.

(56) References Cited

U.S. PATENT DOCUMENTS

| 9,425,893 | B1 | 8/2016 | Srinivasan et al. | |
| 2009/0269076 | A1 | 10/2009 | Cai et al. | |
| 2013/0216219 | A1* | 8/2013 | Honda | H04B 10/695 398/27 |
| 2014/0108879 | A1 | 4/2014 | Hirth | |
| 2015/0085914 | A1 | 3/2015 | Kizer et al. | |
| 2015/0089319 | A1 | 3/2015 | Ghiasi et al. | |
| 2015/0106668 | A1 | 4/2015 | Ran | |
| 2019/0222502 | A1* | 7/2019 | May | H04K 1/003 |
| 2020/0228200 | A1* | 7/2020 | Maccaglia | H04J 14/0271 |
| 2021/0013998 | A1 | 1/2021 | Sun et al. | |
| 2022/0416899 | A1* | 12/2022 | Kosugi | H04B 10/07953 |

FOREIGN PATENT DOCUMENTS

| EP | 3474507 A1 | 4/2019 |
| EP | 3598348 A1 | 1/2020 |

OTHER PUBLICATIONS

Keysight Technologies, "Overcome Forward Error Correction Challenges in 400G Device Designs", white paper, Oct. 31, 2019, 7 pp.
Keysight Technologies, "Validating the New World of 400 Gigabit Ethernet", white paper, May 22, 2020, 21 pp.

(Continued)

*Primary Examiner* — Thien Nguyen
(74) *Attorney, Agent, or Firm* — Shumaker & Sieffert, P.A.

(57) ABSTRACT

In an example of the disclosed techniques, a method comprising computing, by a computing system, a distribution of symbol errors in a forward error correction (FEC) frame transmitted in an optical signal. The method further includes, in response to determining that the distribution of symbol errors indicates a burst error that satisfies a threshold, adjusting, in an optical transceiver module, one or more of a pre-cursor setting, a post-cursor setting, or a signal amplitude for the optical signal.

19 Claims, 9 Drawing Sheets

(56) References Cited

OTHER PUBLICATIONS

Liu et al., "224 GB/s Per Lane: Options and Challenges", Signal Integrity Journal, Mar. 22, 2021, 7 pp.
Liu, "100+ GB/s Ethernet Forward Error Correction (FEC) Analysis", Signal Integrity Journal, Jul. 9, 2019, 12 pp.
Nicholl et al., "Case Study: FEC architectures for 800 GbE", IEEE 802.3df Task Force, Feb. 3, 2022, 15 pp.
Nicholl et al., "PCS Lane Error Check (BIP-8) Proposal", IEEE P802.3ba Task Force, New Orleans, Louisiana, Jan. 12, 2008, 10 pp.
OIF, "112 Gbps Electrical Interfaces—An OIF Update on CEI 112G Panel Session", DesignCon 2019, Jan. 2019, 36 pp.
Reed et al., "Polynomial codes over certain finite fields", Journal of The Society for Industrial and Applied Mathematics, vol. 8, No. 2, Jun. 1, 1960, 5 pp.
Wang et al., "Analysis and Comparison of FEC Schemes for 200GbE and 400GbE", IEEE Communications Standards Magazine, Mar. 2017, 24 pp.
Yangye et al., "A Way to Evaluate post-FEC BER based on IBIS-AMI Model", Asian IBIS Summit, Shanghai, China, Nov. 13, 2017, 26 pp.
Invitation to Pay Additional Fees and, Where Applicable, Protest Fee from International Application No. PCT/US2023/030465 dated Dec. 8, 2023, 13 pp.
International Search Report and Written Opinion of International Application No. PCT/US2023/030465 dated Mar. 19, 2024, 21 pp.

\* cited by examiner

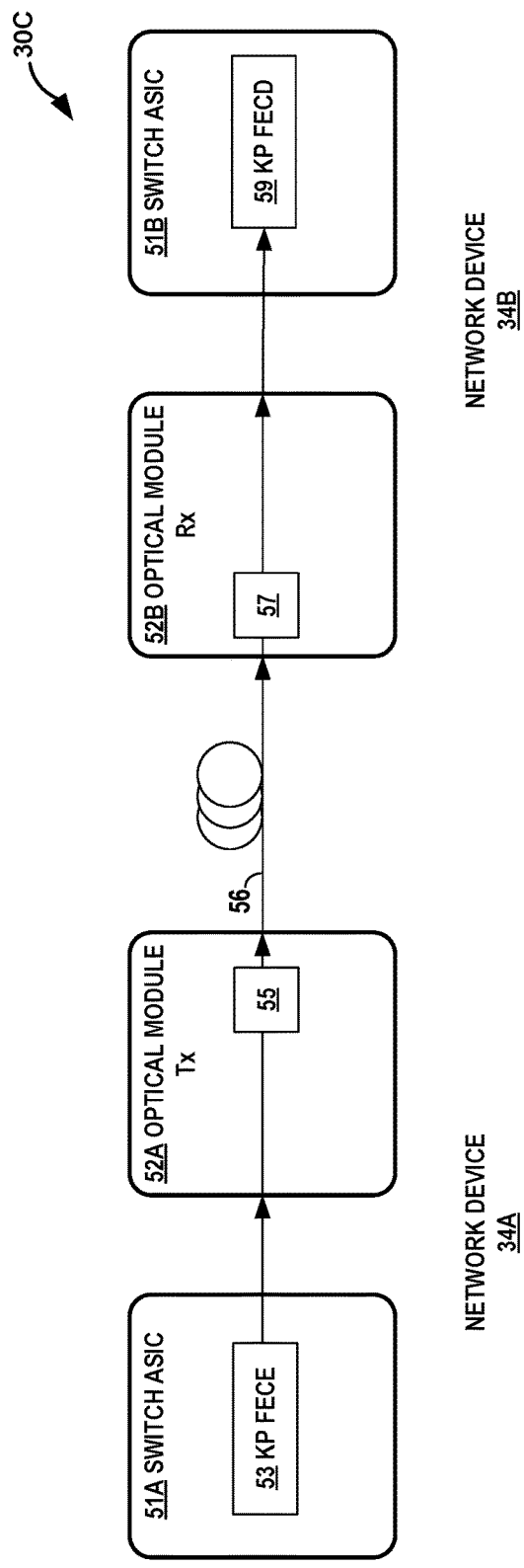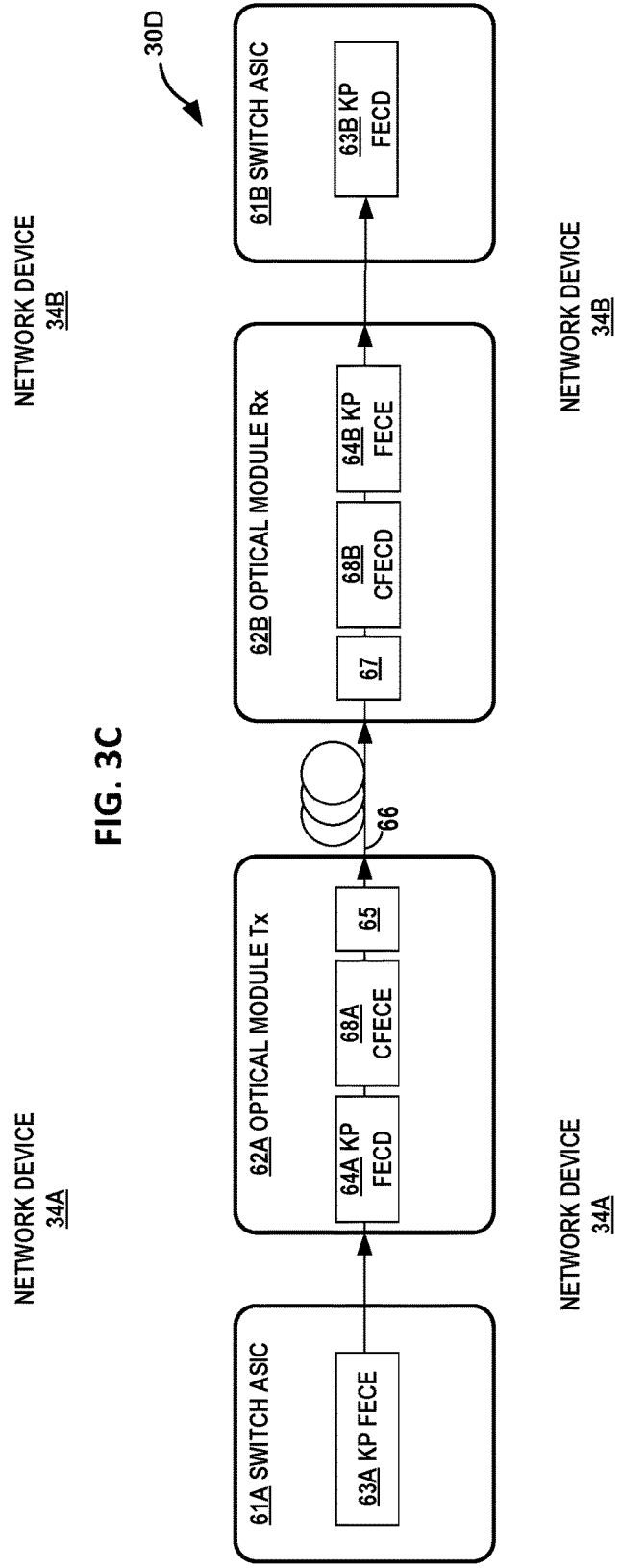
FIG. 3C
FIG. 3D

MONITORING BURST ERRORS IN FORWARD ERROR CORRECTION FRAMES

TECHNICAL FIELD

This disclosure generally relates to optical networks and, more specifically, to optical transceiver modules.

BACKGROUND

A network services exchange provider or co-location provider (a "provider") may employ a communication facility, such as a data center, in which multiple customers of the provider locate network, server, and storage gear and interconnect to a variety of telecommunications and other network service provider(s) with a minimum of cost and complexity. Such customers are said to be "colocated" in the data center. Data centers may be shared by the multiple tenants locating networking equipment within the data centers. With IT and communications facilities in safe, secure hands, telecommunications, Internet, application service providers, cloud service providers, content providers, and other providers, as well as enterprises, enjoy less latency and the freedom to focus on their core business.

In some cases, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "co-location facility." The facility provider may provide services accessible to colocated customers via an interconnection, such services including, for example, a cloud exchange, Internet access, an Internet exchange, a cross-connect from one customer to another, and other interconnection services.

One example of interconnection between different networks within an interconnection facility is a physical cross-connect, in which the provider installs a physical cable (such as a CAT5/6, coax, or optical fiber cable) that then provides a physical (e.g., "layer 0") connection between the customer networks for inter-customer interconnections (between different customers) or intra-customer interconnections (between areas of an interconnection center(s) that are operated/leased by a single customer). For example, a fiber cross-connect may be installed across the floor of an interconnection facility, between floors, across campuses, across distributed interconnection facilities within a metropolitan area (or "metro"), and across distributed interconnection facilities within connection facilities of different metropolitan areas.

SUMMARY

In general, techniques are described for monitoring burst errors in a forward error correction (FEC) frame transmitted in an optical signal. For example, Reed-Solomon (RS) FEC is widely used in 100 Gigabit Ethernet (GE) and 400GE interfaces to improve the signal-to-noise ratio of optical signals. Burst errors can degrade the performance of RS FEC and may be present within an electrical channel that connects a host and module. In the absence of burst errors, the distribution of symbol errors in an FEC frame will follow a Poisson distribution. In some examples, the techniques include comparing measured distribution of symbol errors within an FEC frame with a Poisson distribution to detect and quantify burst errors. In some examples, the pre-FEC bit error rate (BER) can be monitored by measuring error distribution within a received optical signal. Furthermore, signal integrity and power consumption can be effectively re-balanced by using the monitored and measured error distribution as feedback. For example, pre-cursor, post-cursor, and signal amplitude can be adjusted to attempt to reduce the incidence of burst errors and thereby improve FEC performance. The techniques described in the disclosure include detection of burst error, estimation of pre-FEC BER, optimization of signal integrity, and optimization of power consumption.

The techniques may provide one or more technical advantages that realize one or more practical applications. For example, in an optical channel, random errors such as additive white Gaussian noise (AWGN) dominate. In an electrical channel, burst errors severely reduce net code gain (NCG) and degrade system performance, as well as degrade performance of FEC and reduce system margin. Thus, it is critical to detect the presence of burst errors and understand their impact. Bit error rate is an important parameter in any communication channel and affects forward correction errors, which can only correct errors up to a certain threshold. Beyond this threshold, uncorrected codewords occur, leading to frame loss of an optical signal. Thus, it is critical to monitor the BER in real time with high accuracy. Although received optical signals can be compared with transmitted optical signals to derive an accurate error count, this is infeasible in practice. The techniques described in the disclosure may be used to monitor the BER with high accuracy in real time. Many methods have been introduced to improve signal integrity within an electrical channel. Currently, total BER can be optimized in a lab environment by adjusting corresponding parameters. Those parameters may then be applied in a set-and-forget manner. However, performance of signal transmission through the optical channel will degrade due to variation among devices, drift of environment, aging of components, etc. The techniques described in the disclosure can dynamically improve signal integrity based on a feedback mechanism.

The techniques described in the disclosure can be used to detect and monitor burst errors in real time to use as feedback to adjust signal amplitude/integrity while also balancing this goal against power consumption. Power consumption is a critical issue for optical transceiver modules on the transmitting and receiving ends. High power consumption limits port density and increases total cost of ownership (TCO). The techniques described in the disclosure can dynamically optimize power consumption based on a feedback mechanism that balances the goals of less power consumption and reliable signal transmission. The techniques described in the disclosure may be used to improve future 800GE interfaces.

In one example, this disclosure describes a method including computing, by a computing system, a distribution of symbol errors in a forward error correction (FEC) frame transmitted in an optical signal. The method further includes, in response to determining that the distribution of symbol errors indicates a burst error that satisfies a threshold, adjusting, in an optical transceiver module, one or more of a pre-cursor setting, a post-cursor setting, or a signal amplitude for the optical signal.

In another example, this disclosure describes determining, by a computing system, a pre-forward error correction (FEC) bit error rate (BER) based on a bit interleaved parity (BIP) field within an alignment marker of an electrical signal; and in response to determining that the pre-FEC BER based on the BIP field exceeds an estimated BER, adjusting, in an optical transceiver module, a signal amplitude for the electrical signal through the optical channel.

In another example, this disclosure describes a computing system including processing circuitry having access to a memory device, the processing circuitry configured to: compute a distribution of symbol errors in a forward error correction (FEC) frame transmitted in an optical signal; and in response to determining that the distribution of symbol errors indicates a burst error that satisfies a threshold, adjust, in an optical transceiver module, a control setting in an optical transceiver module to modify the optical signal.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3C is a block diagram illustrating another example network device including one or more switch ASICs and one or more optical transceiver modules, in accordance with one or more techniques of the disclosure.

FIG. 3D is a block diagram illustrating yet another example network device including one or more switch ASICs and one or more optical transceiver modules, in accordance with one or more techniques of the disclosure.

Like reference characters refer to like elements throughout the figures and description.

DETAILED DESCRIPTION

Figure 1A:
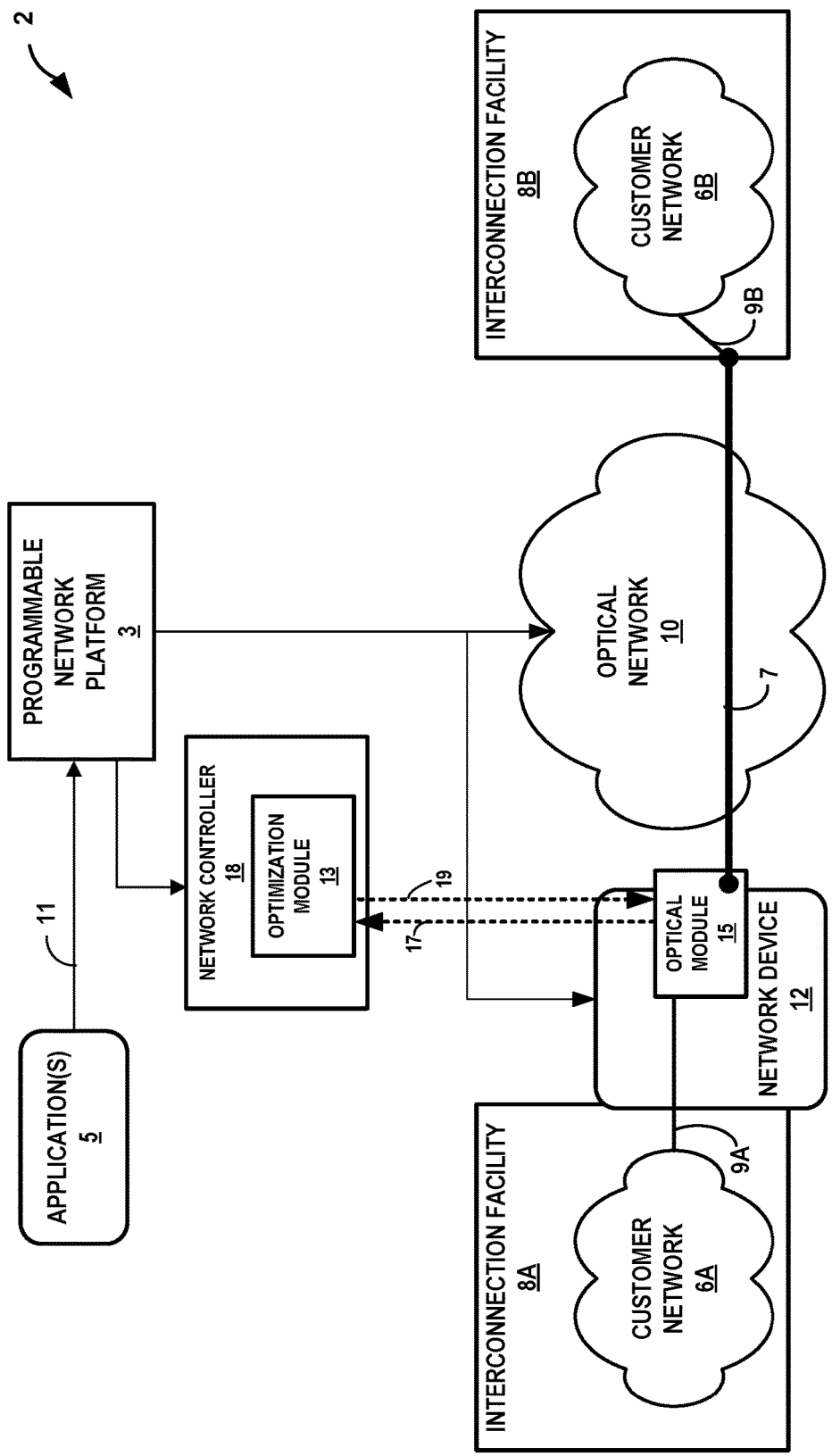
FIG. 1A is a block diagram illustrating an example interconnection system that incorporates a network device having an optical transceiver module, in accordance with one or more techniques of the disclosure.

Connections between optical clients within or between data centers may be provided by optical switches. Optical connection services may typically be used for connections within a data center or a cluster of data centers located close to each other, e.g., within the same campus or regional area such as a metropolitan area.

Direct, dedicated, carrier-grade network links between customers may be spread over a wide geographical area and transport data using dense wavelength division multiplexing (DWDM) optical transponders, and may include multiple types or classes of transport services with different levels of reliability and availability. For example, transport services may include unprotected services, protected services, and dual diverse services. Service provisioning, grooming, protection, and restoration using optical switches may be automated. These types of services may operate across multiple data center locations in data centers across multiple sites in a metropolitan or regional optical network. For example, client signals may originate from different client platforms and be received at an optical network from various sources, e.g., routers, other switches, data center interconnects (DCIs), and the like. The optical network may receive client traffic at 10G, 100G, 400G, or other rates. The incoming client traffic may also have different service classes and Quality of Service (QoS) requirements, such as unprotected, protected, or dual diverse. The number of clients the optical network may service may range from up to a thousand (at 100G speeds) to a few thousand (e.g., at 10G speeds). An optical network of N×N optical switches may switch an incoming client signal to any of the DCI ports, and the DCI ports may adapt/map the client signal to a DWDM signal. The DWDM signal may then be transported through the line system to another node in another data center or location. A network/domain controller may provide signaling and control functions that allow the system to perform functions such as service agnostic allocation of DCI and DWDM channels, service management across multiple optical and disparate networks, disaggregation of optical networks, failure detection and mitigation by re-routing client signals from paths having failed elements to other working paths in the network, using reserve capacity (e.g., ports, switches) to improve network reliability and availability, network optimization and defragmentation, and zero-touch automated provisioning and reconfiguration of client paths.

The perpetually increasing demand for Internet data has driven deployment of high-speed Ethernet interfaces in Internet protocol (IP) router and switch technologies. The current state-of-the-art system is a 400GE (400 gigabit per second Ethernet interface), which is standardized in IEEE 802.3bs. In addition, 800GE (800 gigabit per second Ethernet interface) is under active development. It is expected that demand for 400GE and 800GE will grow rapidly over the coming years. Quality of Service for clients relies on those high-speed Ethernet interfaces for communicating within data centers and between data centers.

Physical layers of 400GE and 800GE interfaces are mostly developed as optical transceiver modules. The most common form-factors are quad small form-factor pluggable—double density (QSFP-DD) and octal small form-factor pluggable (OSFP). An optical transceiver module may be connected to an application specific integrated circuit (ASIC) that switches/routes Ethernet packets. The connection is through an electrical PCB (Print Circuit Board) trace and an electrical connector. Furthermore, optical transceiver modules perform electronic-to-optical conversion and vice versa. Optical transceiver modules are connected through optical fibers. For an end-to-end system, both electrical connections (through PCB traces) and optical connections (through optical fibers) are required.

Noise is present on any communication channel, either electrical or optical. Degradation in signal-to-noise ratio (SNR) will lead to errors within signals that may not be recoverable. Further, retransmitting corrupted signals requires time and resource allocation, leading to increasing costs. To combat this problem, forward error correction (FEC) is widely used to improve receiver sensitivity and increase transmission distance of signals over an optical network. In addition, many requirements for optical transmitters, receivers, and/or transceivers can be relaxed when using FEC, leading to a cost-effective approach. IEEE has approved two FEC codes, KR and KP. Those two codes belong to Reed-Solomon (RS) code, which is a type of linear block code with critical parameters of (n, k, m). Here, n is number of code symbols within a frame, including parity-check symbols; k is number of message symbols from a source message; and m is the number of bits per symbol. The message symbols and the code symbols belong to elements of a Galois field.

KR FEC is mainly used in a non-return-to-zero (NRZ) on-off-keying (OOK) modulation format. Here, n=528, k=514, m=10. Net coding gain (NCG) is 5.3 dB and bit error rate (BER) threshold for uncorrected code word (UCW) is $2.1e^{-5}$. To further increase total data rate during transmission, pulse amplitude modulation 4-level (PAM4) is widely used. However, there is a sensitivity penalty of 4.77 dB for a PAM4 signal. Thus, a strong KP FEC is developed, where n=544, k=514, and m=10. Net coding gain is 6.4 dB and the BER threshold for any UCWs is $2.2e^{-4}$.

KP FEC and KR FEC are used in short-reach optical transceiver modules with optical wavelengths centering around 1310 nm. For long-haul optical transceiver modules with wavelengths centering around 1550 nm, other types of FEC are used. For example, coherent FEC (OFEC) is standardized in a 400GE-ZR module and OFEC is being considered in a 400GE-ZR+ module. In addition, many proprietary FEC schemes are used in advance coherent optical transponders.

A burst error is a consecutive sequence of bits that are different than the same sequence of bits as defined in the source signal. When there are a threshold number of burst errors, the source signal is unreadable, and must be retransmitted. Currently, there are some theoretical approaches to understanding the influence of burst errors on digital signals. Theoretical approaches include the Gilbert-Elliot channel model, applying Monte-Carlo simulation and Markov chain model, etc. However, there is no published method of monitoring and detecting burst errors in practice.

Advantageously, techniques of this disclosure describe a solution of monitoring and mitigating burst errors: monitoring digital signals for errors, generating an error distribution, comparing the generated error distribution to an expected error distribution for random background noise, and adjusting pre-cursor, post-cursor, and/or signal amplitudes based on the comparison. For example, techniques of this disclosure include monitoring symbol errors of a FEC frame, generating an error distribution of the monitored symbol errors, comparing the error distribution to an expected error distribution, and then adjusting one of a pre-cursor, post-cursor, and signal amplitudes based on the comparison. As for another example, techniques of this disclosure include monitoring a pre-FEC BER by relying on bit-interleaved parity (BIP) used in an alignment marker. The pre-FEC BER error distribution is generated, and then compared to a pre-FEC BER error distribution. One of a pre-cursor, post-cursor, and/or signal amplitude is adjusted based on the comparison. In one example, we compare two pre-FEC BER values: one obtained from BIP field in the alignment marker and the second is from the error distribution.

The alignment marker may be a single 66-bit block that is periodically inserted into an Ethernet stream. However, accuracy of BER monitoring through BIP is low due to low occurrence of alignment markers. Also, BER result is saturated beyond $1e^{-6}$. Currently, total BER is used to optimize parameters of signal integrity. Those parameters are applied in a set-and-forget manner. In addition, many signal-integrity improvement methods are prone to burst errors, including a continuous time-domain equalizer (CTLE), decision feedback equalizer (DFE), reflection canceller (RC), slicer, and level-dependent equalizer (LDEQ). A generic total BER reading does not provide insight on optimization of those parameters.

Power consumption is a limiting factor in many scenarios for a host system with an optical transceiver module. Furthermore, any increase in power consumption in optical transceiver modules leads to increase in power consumption used for system cooling by ~5 times. Signal amplitude from optical transceiver modules plays a role in determining the power consumption. Currently, signal amplitude is applied in a set-and-forget manner that does not take into consideration changing factors leading to signal degradation.

Advantageously, the present disclosure describes techniques for an innovative approach to detect and monitor burst errors in real-time, estimate BER with high accuracy, and optimize signal integrity and power consumption precisely and adaptively. Techniques of the present disclosure have unique advantages over the current state of art. The techniques can be applied in multiple ways. For example, in a certification phase, the techniques can be used to select superior optical transceiver modules and host systems, leading to longer transmission distances for optical transceiver modules and an improved signal-to-noise ratio, thus, achieving reduction of capital expense. In a deployment phase, techniques of the present disclosure can monitor performance of optical transceiver modules and host systems. End users may receive critical information like pre-FEC BER, burst errors, and so on. In addition, an alarm can be triggered when error thresholds are satisfied. Signal integrity and power consumption can be optimized in real time based on a feedback mechanism, leading to a reduction of operational expense and total cost of ownership.

FIG. 1A is a block diagram illustrating an example interconnection system that incorporates a network device having an optical transceiver module, in accordance with one or more techniques of the disclosure. Interconnection system 2 depicts interconnection facilities 8A-8B (collectively, "interconnection facilities 8") operated by an interconnection system provider, the interconnection facilities 8 connected by an optical network 10 configurable for cross-connecting customer networks 6A-6B (collectively, "customer networks 6"). In some instances, each of customer networks 6 may be associated with a different customer of the interconnection system provider. In some instances, customer networks 6 are both associated with a single customer of the interconnection system provider. As used herein, the term "customer" of the interconnection system provider may refer to a tenant of an interconnection facility 8 deployed by the interconnection system provider, whereby the customer leases space within the interconnection facility 8 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity.

Each of interconnection facilities 8 may represent different data centers geographically located within different metropolitan areas to provide resilient and independent interconnection services exchange by which customers of one metropolitan area and customers of a different metropolitan area may connect to receive and provide, respectively, services.

In each of the interconnection facilities 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the same interconnection facility 8 and/or to other customer(s) co-located in another interconnection facility 8.

Optical network 10 (including network device 12) represents optical and photonic switching infrastructure that is configured by programmable network platform 3 to create an optical channel 7 that connects customer network 6A and customer network 6B co-located in interconnection facilities 8A and 8B, respectively. Optical network 10 may include pre-installed optical fiber between customer networks 6 and at least one distribution facility (or "distribution frame") of the interconnection facilities 8 and may further include pre-installed optical fiber between multiple distribution facilities of the interconnection facilities 8. Optical network 10 may further include programmable photonic switches located within distribution facilities of the interconnection facilities 8 and/or located at the demarcation of customer space located in interconnection facilities 8. While described herein dynamically configurable, much of optical network 10 may be statically configured by a network operator associated with the interconnection facility provider, a network service provider that manages aspects of optical network, or other entity.

Although described in the context of an optical channel connecting networks located in separate interconnection facilities, the techniques may be applied in the context of an optical channel connecting networks located in the same interconnection facility, e.g., a single data center. In addition, the techniques can be applied to an optical channel connecting any two networks, and not merely to customer networks of customers of an interconnection facility provider.

Optical network 10 may include one or more optical network devices such as DCI transponders, muxponders, optical transceivers, channel multiplexors/demultiplexers, amplifiers, and/or optical switches, such as a wavelength selective switches (WSS), photonic cross-connect (PXC), optical cross-connect (OXC), optoelectronic based switch (OEO), or other types of devices that switch optical signals. An optical switch may route optical signals (light beams or lambdas) between optical fibers coupled to the optical switch.

In this example, system 2 further includes a programmable network platform (PNP) 3, alternatively referred to herein as an "interconnection platform." Programmable network platform 3 may expose a software interface that defines the methods, fields, and/or other software primitives by which application(s) 5 may invoke PNP 3 to dynamically provision an optical channel 7 between customer networks 6A, 6B. In this way, PNP 3 allows customers, carriers, network service providers (NSPs), and/or the interconnection system provider itself with the programmatic capability of configuring optical network 10 to interconnect customer network 6A to customer network 6B with optical channel 7.

Programmable network platform 3 may represent an application executing within one or more data centers of system 2 or alternatively, off-site/remotely at a back office or branch of the interconnection system 2 provider, for instance. Programmable network platform 3 may be distributed in whole or in part among the interconnection facilities. As illustrated in FIG. 1, programmable network platform 3 may control service provisioning for multiple different interconnection facilities. Alternatively, or additionally, multiple separate instances of the programmable network platform 3 may control service provisioning for respective multiple different interconnection facilities.

Application(s) 5 represents at least one application that communicates with PNP 3 to request and dynamically provision an interconnection between interconnection facilities 8 of customer networks 6A, 6B. Application(s) 5 represent client-side software for interfacing with PNP 3 and may include a customer portal, customer applications, an interconnection system 2 provider application that is accessible only to operators of interconnection facilities 8, a console such as a command-line interface or graphical user interface. Users or clients of application(s) 5 may include enterprise customers, cloud service and content providers, carriers, network service providers (NSPs), and/or the interconnection system provider itself, for instance.

An application of application(s) 5 may issue, to PNP 3, an interconnection request 11 that specifies parameters for interconnecting between interconnection facilities 8 of customer networks 6A and 6B. In response to receiving interconnection request 11, PNP 3 determines a path for the interconnection, e.g., an optical path through optical network 10, and dynamically provisions a path for the interconnection with optical channel 7 in optical network 10 to provide fiber-based interconnection between customer networks 6A, 6B to satisfy the interconnection request 11. Example parameters for interconnection request 11 may include requested bandwidth, type of service (e.g., protected, unprotected, dual diverse, etc.), port identifiers, and the like.

PNP 3 configures elements of optical network 10 by issuing configuration commands either directly to elements within optical network 10 by way of configuration interfaces of the elements, or indirectly to such elements via software-defined networking (SDN) controllers, e.g., an SDN controller, that manage the elements on behalf of the PNP 3. PNP 3 may in some instances be alternatively referred to as an orchestrator in that PNP 3 orchestrates one or more SDN controllers to configure optical network devices 4 (e.g., photonic switches) and/or other elements of optical network 10 to establish optical channel 7.

Programmable network platform 3 configures optical network devices to switch optical signals along optical paths, each optical path beginning at an optical transmitter and terminating at an optical receiver and each of the optical transmitter and optical receiver being associated with one of customer networks 6. In this way, customer networks 6 may exchange frames and packets for L0/L1/L2/L3 services via dynamically provisioned fiber cross-connects. An optical path may alternatively be referred to as an optical path, a light path, a lambda or an optical transport network wavelength, or a composite DWDM optical signal. Example bandwidths for an optical path for a cross-connect may include, e.g., 2.5 Gbps, 10 Gbps, 40 Gbps, 100 Gbps, 400 Gbps, or even multi-terabit DWDM optical signals. An optical fiber may include multiple optical paths, i.e., the optical fiber may transport optical signals for multiple optical paths as different lambdas, for instance. Optoelectronic-based switches may limit switching applications according to the data rate, protocol, and format supported by the electronic components of switches.

Optical channel 7 may represent a Layer 0 ("L0") connection in that the fiber cross-connect underlies the Open Systems Interconnection (OSI) model or TCP/IP model for packet networking. In particular, optical channel 7 may underlie an optical transport network (OTN) layer that (typically in conjunction with a SONET/SDH layer) provides Layer 1 ("L1") connectivity between optical network devices 4 such as wavelength division multiplexing (WDM) devices. For instance, optical channel 7 may represent one or more wavelengths (or "lambdas") photonically switched by elements of optical switch fabric to provide an optical path (or "light path") for optical signals exchanged between customer networks 6A, 6B associated with different customers/tenants of the interconnection system 2 provider. In this way, optical network 10 is configured to provide non-blocking switching by way of a high-speed fiber connection between respective customers networks 6A, 6B for the customers of the interconnection system 2 provider and, in doing so, may provide reliable and low-latency communication between customer networks 6A, 6B. Optical channel 7 may be statically or manually provisioned by the interconnection system provider, for instance, or dynamically provisioned using PNP 3.

Customer networks 6A, 6B use respective access links 9A, 9B to access optical channel 7 to exchange data. Access links 9A, 9B may represent, in some instances, grey links/optics, in which a router or switch of customer networks 6A, 6B exchanges grey (uncolored) optical signals with a coherent optical device that converts between a grey optical signal and an optical signal at a specific wavelength (color) exchanged with an optical network device of optical network 10.

Optical channel 7 may in some cases underlie a layer 2 ("L2") or layer 3 ("L3") service provided by the interconnection system 2 provider to interconnect customer networks 6A, 6B according to an L2 or L3 service. For example, interconnection facility 8 may operate a network services exchange, such as Ethernet Exchange, and Internet Exchange, and/or a Cloud Exchange, and each of these may make use of dynamically provisioned optical channel 7 to transmit L2/L3 packet data between customer networks 6A, 6B.

In accordance with techniques described in this disclosure, optical network 10 includes at least one network device 12. Network device 12 may represent an optical patch panel switch for a patch panel of a customer cage that hosts customer network 6A within interconnection facility 8A. Network device 12 may represent a packet switch/router, optical transport equipment, such as a data center interconnect (DCI) transponder, and so on. Network device 12 may be communicatively coupled to optical module 15, which may be an optical transceiver module inserted into network device 12. Optical module 15 may convert electrical signals travelling within a printed circuit board, via a switch, to optical signals for transmission through the optical network 10 along fiber cross-connect 7. In addition, another network device 12 may be configured to receive signals and may be communicatively coupled to another optical module 15 (which may be a receiver optical module, a transmitter optical module, or a transceiver optical module) that is configured to receive the transmitted optical signal and convert the optical signals to electrical signals for transmission through another printed circuit board, as discussed in further detail with respect to FIG. 2, but not shown in FIG. 1 for ease of illustration purposes. Network device 12 may be programmable and, in some cases, may be located within distribution facilities of interconnection facilities 8A and/or 8B.

In some examples, optical module 15 may be communicatively coupled to network controller 18. Network controller 18 may execute an optimization module 13 to monitor burst errors in a forward error correction (FEC) frame transmitted in an optical signal. Optical module 15 may transmit error data 17 to optimization module 13, and optimization module 13 may transmit optical channel configuration data 19 to the optical module 15. Error data 17 may include information pertaining to symbol errors within forward error correction (FEC) frames, pre-FEC bit error rates, FEC frames, and so on. Optimization module 13 may process error data 17 to compute a distribution of symbol errors in a forward error correction (FEC) frame, a pre-FEC BER distribution, or other indicia of errors, for optical signals transmitted through the optical network 10 via optical channel 7. These error distributions may be compared to expected error distributions (e.g., random or Poisson distributions) to detect burst error within the optical signals. Optical channel configuration data 19 may be configuration data for the optical module 15 computed by optimization module 13 to mitigate burst errors on optical channel 7. The optical channel configuration data 19 may include, for example, pre-cursor settings, post-cursor settings, and/or signal amplitude settings that, when configured in optical module 15, cause optical module 15 to adjust optical signals transmitted through the optical network 10 via optical channel 7, in accordance the optical channel configuration 19.

Figure 1B:
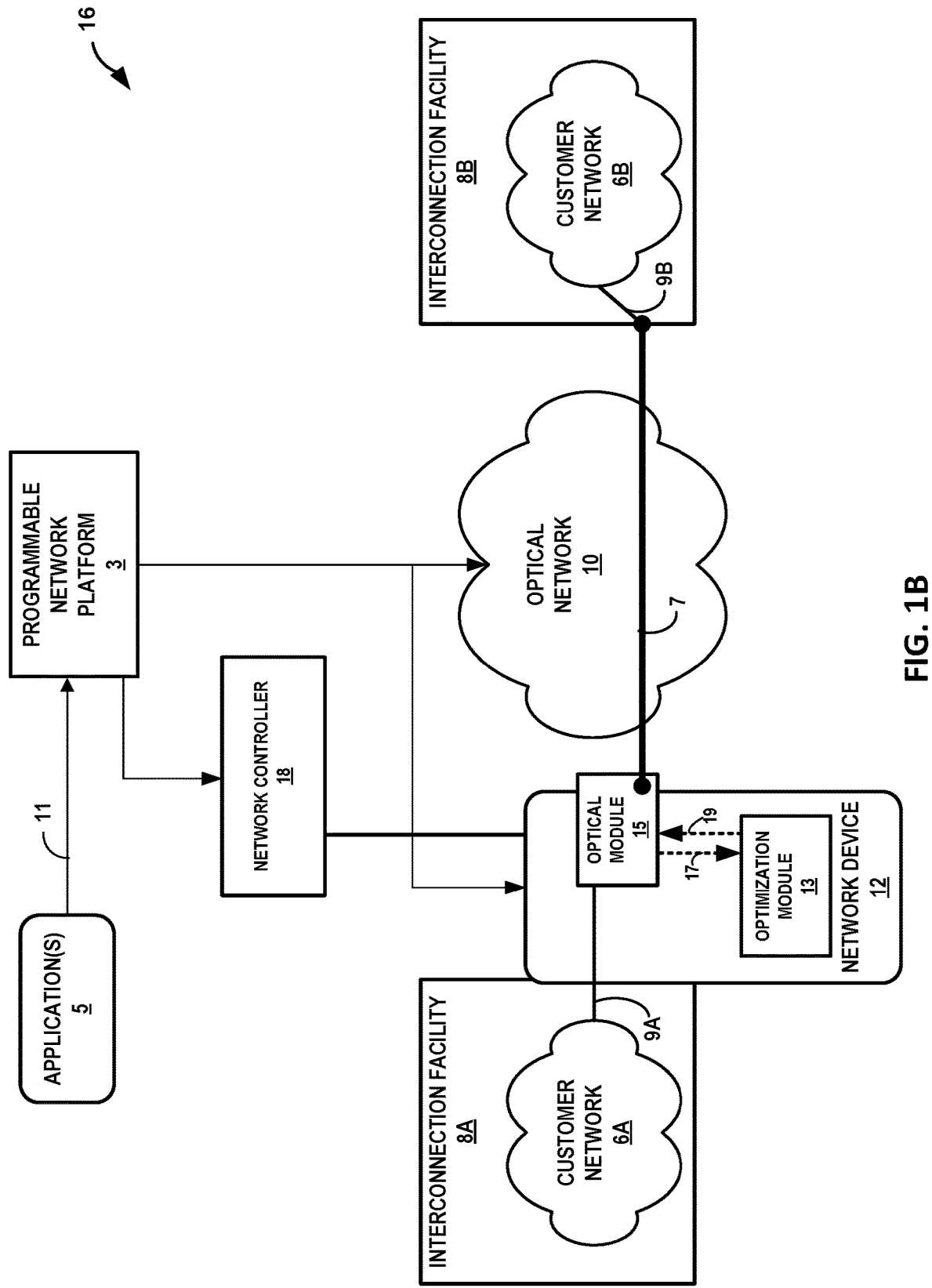
FIG. 1B is a block diagram illustrating an example interconnection system that incorporates a network device having an optical transceiver module and an optimization module, in accordance with one or more techniques of the disclosure.

FIG. 1B is a block diagram illustrating an example interconnection system that incorporates an optical switch having an optical module and an optimization module, in accordance with one or more techniques of the disclosure. In contrast to the example of FIG. 1A, the optimization module 13 may be integrated within the network device 12. For example, the optimization module 13 may be executed by processing circuitry of network device 12. For example, the optimization module 13 may be electrically coupled to a printed circuit board (e.g., the printed circuit board 21, as described with respect to FIG. 2). Optimization module 13 may receive error data 17 from optical module 15, compute a distribution of symbol errors in a forward error correction (FEC) frame transmitted in an optical signal, compare the computed distribution of symbol errors to an expected distribution of symbol errors (as discussed below), and generates optical channel configuration data 19 based on the comparison, to detect burst error. Optimization module 13 configures optical module 15 with optical channel configuration data 19 to adjust optical signals transmitted through the optical network 10 via optical channel 7, in accordance the optical channel configuration data 19. Error data 17 and optical channel configuration data 19 are similar to those described with respect to FIG. 1A.

As discussed with reference to FIGS. 1A-1B, optimization module 13 may determine the expected distribution of symbol errors as follows. Forward error correction (FEC) is a digital signal technique used to enhance digital signal reliability over networks that may be unreliable or noisy. Concatenating an FEC frame to a digital signal allows the receiver to correct for bit errors within the digital signal traversing a network without needing to retransmit the data.

Reed-Soloman (RS) FEC, like KP and KR FEC, are widely used in high-speed Ethernet interface technology. After error detection and correction, the optimization module 13 (e.g., via the burst error estimator 450) can provide statistical analysis of symbol errors within an FEC frame. If a symbol error is caused by random noise, the number of symbol errors, x, in an FEC frame will follow a Poisson distribution. The theoretical distribution (expected distribution) of symbol errors ('theoretical distribution of symbol errors' hereinafter is used interchangeably with 'expected distribution of symbol errors'), Pr_theo(x), is determined by $$\text{Pr\_theo}(x) = \lambda^x e^{-\lambda}/x! \quad (1)$$

where $\lambda$ is the mean of expected symbol errors within an FEC frame. For RS FEC, a symbol is formed by 10 bits. The symbol error rate (SER) can be determined as:

$$\text{SER} = 1 - (1-\text{BER})^m \approx m \ast \text{BER} \quad (2)$$

where m is the number of bits (e.g., 10, etc.). Thus, within an FEC frame containing n symbols, $\lambda$ is determined as:

$$\lambda = n \ast \text{SER} \approx n \ast m \ast \text{BER} \quad (3)$$

The computing system can determine the measured distribution of symbol errors Pr_meas(x) as following:

$$\text{Pr\_meas}(x) = \text{CW}(x)/\text{CW}_{total} \quad (4)$$

$$\text{CW}_{total} = \text{UCW}_{count} + \Sigma_{x=0}^{x=(n-k)/2} \text{CW}(x) \quad (5)$$

where CW(x) is obtained FEC codewords (e.g., obtained by the optical module 13, which may be a receiver optical module) with x representing the number of errors, $\text{CW}_{total}$ is total number of symbols including both correctable codewords and uncorrectable codewords, $\text{UCW}_{count}$ is the count of UCW, which is uncorrectable codewords, and (n−k)/2 is the maximum number of symbol errors which can be corrected within an FEC frame.

Next, the computing system can compare Pr_theo(x) with Pr_meas(x), as discussed herein. If Pr_theo(x) deviates from Pr_meas(x) by a predetermined amount, a threshold may be satisfied, indicating an influence of burst errors within the FEC frame.

Techniques of the present disclosure allow selection of superior optical modules (e.g., fixed or pluggable optical transceiver modules, and so on) and host systems. For example, by minimizing burst errors, the computing system can stretch the transmission distance of optical transceiver modules beyond its nominal specifications. In practice, a system (e.g., system 2) cannot accurately measure the BER of digital signals without prior knowledge. The techniques of this disclosure, by contrast, permit estimating BER using real-time data. One method is to rely on a bit interleaved parity (BIP) field within an alignment marker. However, alignment markers are not often inserted into data streams because of costs of implementation.

It can be demonstrated that BER can be estimated from error distribution. Based on Poisson distribution, equation (1) is simplified by inputting the number of symbol errors for 0 and 1, to arrive at:

$$\text{Pr\_theo}(0) = e^{-\lambda}, \text{Pr\_theo}(1) = \lambda e^{-\lambda} \quad (6)$$

Next, the computing system can estimate the BER (defined as $\text{BER}_{est}$) based on the following formulas:

$$\lambda_{est} = \frac{\text{Pr\_theo}(1)}{\text{Pr\_theo}(0)} \approx \frac{\text{Pr\_meas}(1)}{\text{Pr\_meas}(0)} = \frac{CW(1)}{CW(0)} \quad (7)$$

$$BER_{est} = \lambda_{est}/n/m$$

This way, the computing system only needs to monitor CW(1) and CW(0) to get an accurate estimation of BER. With no corrected codewords, CW(0), there is no error. In CW(1), any influence of burst errors is limited within one symbol (10 bits). Thus, the influence of burst errors on estimation above is negligible.

In a system dominant by random noise, this method above is highly accurate. The optimization module (e.g., optimization modules 13, 424) can use $\lambda_{est}$ and $\text{BER}_{est}$ to plot the theoretical (expected) curve and compare with the obtained measured results. For example, the optimization module 13 may receive error data 17 from optical module 15 and, using burst error estimator (e.g., burst error estimator 424, discussed with reference to FIG. 4), compute an estimated distribution of symbol errors of an FEC frame, and then plot the computed results against expected distribution of symbol errors. A tight curve may indicate that the expected distribution of symbol errors is close to the computed distribution of symbol errors, alluding to no presence of burst errors.

Alternatively, the computing system can perform a curve fitting on the first few data points in the distribution of symbol errors. The computing system can estimate $\lambda_{est}$ by minimizing $\lambda_{est}$ and $\text{Err}_{fit}$ as shown in equation (8). Here, upper limit l is the number of data points used for curve fitting. Next, the computing system determines $\text{BER}_{est}$ accordingly. This approach will remove any uncertainty created by measurement error on a single data point and provide even higher accuracy. For example, the computing system can perform a curve fitting on $\text{Pr}_{meas(0)}$, $\text{Pr}_{meas(1)}$, and $\text{Pr}_{meas(2)}$.

$$Err_{fit} = \sum_{x=0}^{x=l} \left[\frac{\text{Pr\_theo}(x) - \text{Pr\_meas}(x)}{\text{Pr\_meas}(x)}\right]^2 \quad (8)$$

On the other hand, for a system suffered from burst errors, the estimated BER from CW(1) and CW(0) will not be accurate. This observation allows us to develop an even simpler method to monitor the performance of errors within a system, where the computing system estimates the BER based on a BIP field, defined as $\text{BER}_{BIP}$. For example, the alignment markers have a fixed data pattern defined by IEEE standard 802.3bs. BIP fields are a part of the alignment marker. The receiver optical module can compare the received signal with this known pattern and determine BER. Accuracy can be improved by using a longer measurement period. Meanwhile, the computing system determines $\text{BER}_{est}$ based on Equation (7). If $\text{BER}_{est}$ is close to $\text{BER}_{BIP}$, the computing system may conclude that the system is dominated by random noise. If $\text{BER}_{BIP}$ is larger than $\text{BER}_{est}$, the computing system may determine that burst errors are present and take certain action to improve performance. If the difference between $\text{BER}_{BIP}$ and $\text{BER}_{est}$ is above a certain threshold, the computing system may alarm a user. For example, the computing system may be communicatively coupled to a hand-held device, operated by a technician, and send the alarm to the hand-held device.

Techniques of the present disclosure can be applied in both a certification phase and a deployment phase. During the certification phase, techniques may allow selection of superior components to achieve optimal performance, leading to a reduction of capital expense. During the deployment phase, the computing system can continue monitoring critical parameters, such as pre-FEC BER and burst errors within symbols of an FEC frame and provide valuable information to the end users.

In addition to comparing a computed symbol error distribution to an expected symbol error distribution, the optimization module 13 can derive an estimated BER using the above equations to improve signal integrity in an electrical channel. Currently, the parameters of those methods are optimized based on eye diagram which requires an expensive external instrument such as a digital communication analyzer (DCA). Alternatively, total BER can be used which does not take into consideration burst errors and random errors. After initial calibration, those parameters are stored into an optical transceiver module or host system and do not change dynamically afterward, e.g., based on feedback. For example, a feedback mechanism can be used to tune at least one of CTLE, DFE, RC, Slicer, and LDEQ, as discussed above. However, system performance will degrade due to variation among devices, drift of environment, and aging of components. Techniques of the present disclosure address these issues by dynamically adjusting pre-cursor settings, post-cursor settings, and/or signal amplitude based on an indication of burst errors. For example, within an optical transceiver module, there is a micro-controller which has electrically erasable programmable read-only memory (EEPROM). Some registers within the EEPROM correspond to the setting of pre-cursor, post-cursor and signal amplitude. There may be an inter-integrated circuit (IIC) bus between the host and the optical transceiver module. The host can communicate with the optical transceiver module through the IIC bus and adjust each of the registers to change the setting of any of the pre-cursor setting, post-cursor setting, and/or signal amplitude.

Electrical signal amplitude plays a role in determining an amount of allocated power for consumption by an optical transceiver module. With a high electrical signal amplitude, power consumption of the module will increase. In addition, a high signal amplitude will increase crosstalk between adjacent electrical channels. On the other hand, a low signal amplitude reduces signal-to-noise ratio (SNR) in the electrical channel, leading to a high BER. Thus, there is an optimal setting for electrical signal amplitude for any particular system depending on environmental conditions. In the existing computing system, the electrical signal amplitude can be optimized in lab environment and applied in a set-and-forget manner. However, setting and forgetting does not allow for real-time adjustments responsive to changing environmental conditions. For the purposes of the present disclosure, the term "optimize" is not to be confused only with the idea of making perfect, and includes reasonable interpretations of optimize (especially from the perspective of an inventor), such as improve a signal amplitude (or pre-cursor or post-cursor settings) to reduce power consumption (including power consumption of external systems, such as server cooling units), increase SNR, and other attributes that positively affect a system and allocation of resources of the system.

Figure 2:
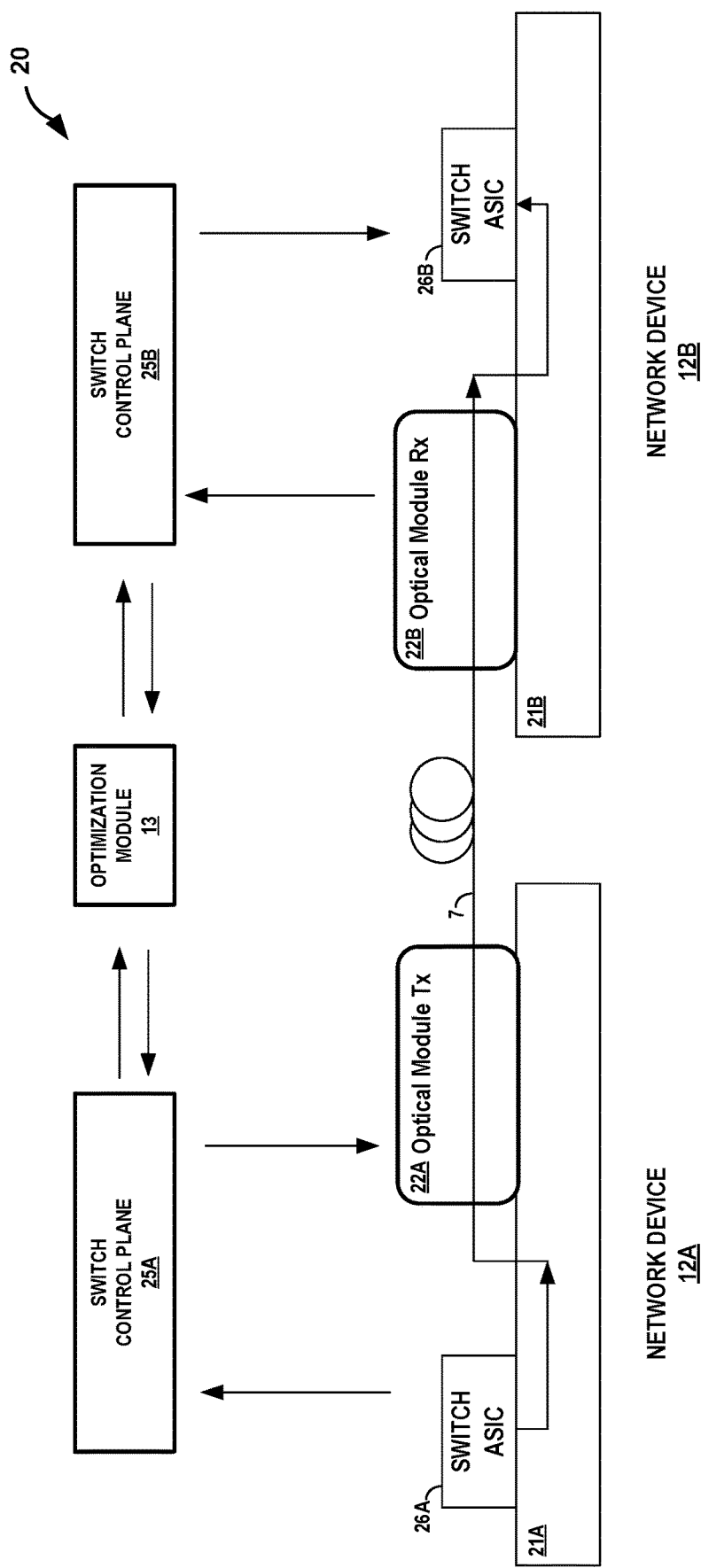
FIG. 2 is a block diagram illustrating an example system including one or more optical transceiver modules, in accordance with one or more techniques of the disclosure.

FIG. 2 is a block diagram illustrating further details of one example of a computing system that operates in accordance with one or more techniques of the present disclosure. Optical system 20 includes a network device 12A that may be used to transmit and convert digital signals, from electrical signals to optical signals, to a network device 12B. Network device 12B receives optical signals transmitted over an optical network (e.g., optical network 10, FIGS. 1A-1B), via optical channel 7, and can convert the received optical signals to electrical signals. Network devices 12A-12B may represent a packet switch/router, optical transport equipment, such as a data center interconnect (DCI) transponder, and so on.

For example, network device 12A may include a switch application specific integrated circuit (ASIC) 26A and an optical transceiver module 22A. Network device 12B may include a switch ASIC 26B and an optical transceiver module 22B. Optical transceiver modules 12A-12B are each connected to a corresponding switch ASIC 26A that switches/routes Ethernet packets over the optical network 10 via optical channel 7. The connection of the optical transceiver modules 22A-22B is through an electrical PCB (Print Circuit Board) 21A-21B trace and an electrical connector. Furthermore, optical transceiver modules 22A-22B perform electronic-to-optical conversion and vice versa. For example, optical transceiver module 22A receives electrical signals from switch ASIC 26A and then converts the electrical signals to optical signals for transmission to optical transceiver module 22B, where the optical signal is converted to an electrical signal, that is then transmitted to switch ASIC 26B. Optical transceiver modules 22A-22B are communicatively coupled through optical channel 7. As seen in FIG. 2, for an end-to-end optical system 20, both electrical connections (through PCB 21A-21B traces) and optical connections (through optical channel 7) are required.

Optical system 20 further includes switch control planes 25A-25B and an optimization module 13 (as discussed with reference to FIG. 1A-1B). Switch control planes 25A-25B control forwarding of digital signals throughout optical system 20. For example, switch control plane 25A controls the forwarding of electrical signals transmitted from the switch ASIC 25A to optical transceiver module 22A. Switch control plane 25A further controls forwarding of optical signals, from the optical transceiver module 22A, through the optical channel 7, destined for optical transceiver module 22B. Switch control plane 25B is communicatively coupled to switch control plane 25A, via optimization module 13. Switch control plane 25B can receive information from switch control plane 25A regarding forwarding of the digital signals, such as routing tables including protocols to identify network paths, digital signal delivery, and so on. Switch control plane 25B can obtain errors within received digital signals. For example, switch control plane 25B may obtain symbol errors within FEC frames, bit errors, and so one, and generate error data (e.g., error data 17) destined for the optimization module 13. Switch control planes 25A-25B may include processing circuitry, such as general-purpose processors, and in some cases either or both switch control planes 25A-25B may execute an instance of optimization module 13.

In some examples, optimization module 13 can act as an intermediary between switch control planes 25A-25B. Further, optimization module can receive the obtained errors in the form of error data 17 from switch control plane 25B, compute a symbol error distribution of received FEC frames, compare the computed distribution of symbol errors in the FEC frame to an expected distribution of symbol errors (e.g., as discussed above), determine that the distribution of symbol errors indicates a burst error based on the comparison satisfying a threshold, and then determine configuration data (e.g., optical channel configuration data 19) for switch control plane 25A. Switch control plane 25A may receive the optical channel configuration data 19 configure one or more of switch ASIC 26A or optical transceiver module 22A to adjust one or more of a pre-cursor setting, a post-cursor setting, or a signal amplitude for the optical signal transmitted via optical transceiver module 22A. For example, the adjustment of the pre-cursor setting, post-cursor setting, or signal amplitude may modify the signal-to-noise ratio, modify power consumption by network device 12A, and/or have the effect of modifying power consumption by an external cooling system (e.g., within a data center) needed for maintaining a temperature of optical system 20 or other systems.

FIGS. 3A-3D are discussed together. FIGS. 3A-3D illustrate multiple configurations of varying types of forward error correction (FEC) encoders and decoders integrated within various types of optical transceiver modules and/or switch ASICs. Certain types of optical transceiver modules may be more suitable than others, depending on parameters (distance between optical switches, bandwidth, and so on). The techniques described herein apply to various configurations of network devices and networks. For example, optical transceiver modules may perform FEC, switch ASICs may perform FEC, and so on.

Figure 3A:
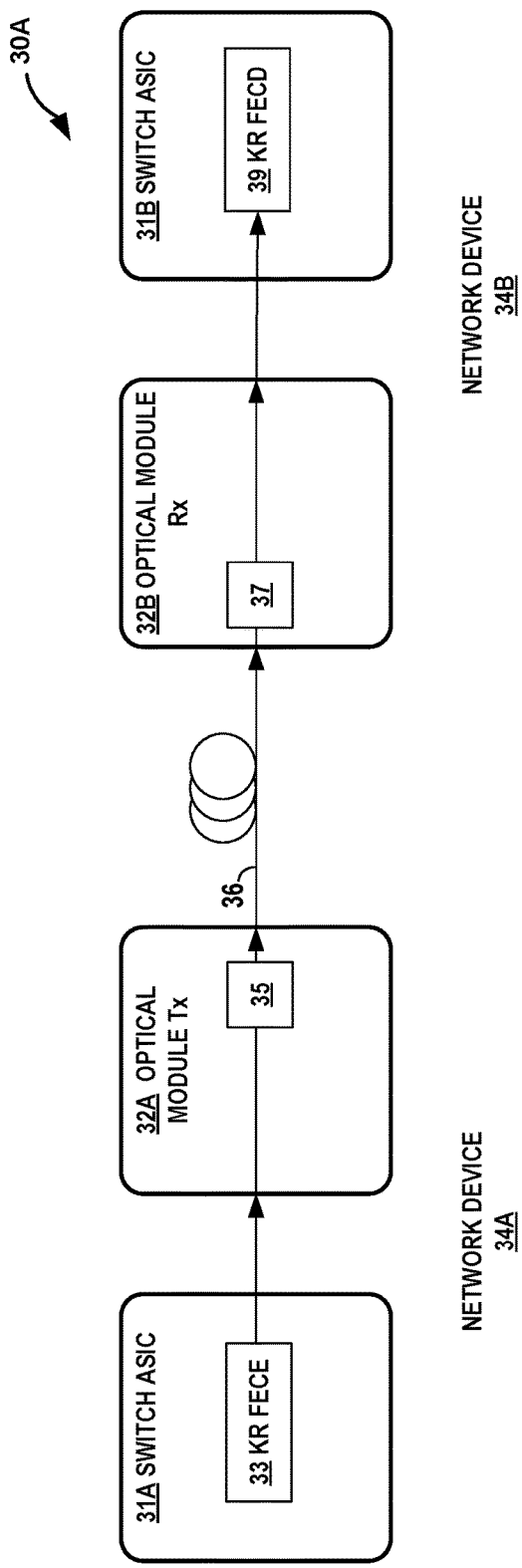
FIG. 3A is a block diagram illustrating example network device including one or more switch ASICs and one or more optical transceiver modules, in accordance with one or more techniques of the disclosure.

FIG. 3A is a block diagram illustrating one example of a computing system with a forward error correction (FEC) encoder (FECE) and an FEC decoder (FECD) within respective switch ASICs. Computing system 30A includes a network device 34A that includes a switch ASIC 31A (e.g., switch ASIC 26A), which includes an optical transceiver module 32A (e.g., optical transceiver module 22A). Network devices 34A-34B may represent a packet switch/router, optical transport equipment, such as a data center interconnect (DCI) transponder, and so on. Optical transceiver module 32A may be an optical transceiver capable of receiving electrical signals transmitted from a KR FEC encoder (FECE) 33, converting the electrical signals to optical signals, and then transmitting, via optical transmitter 35 over an optical channel 36 (e.g., optical channel 7), the optical signals to an optical receiver 37 of an optical transceiver module 32B. Optical transceiver module receiver 32B converts the received optical signals to electrical signals for transmission to a KR FEC decoder (FECD) 39, which is integrated within a switch ASIC 31B. In an example, optical transceiver modules 32A-32B may be 100 GE coarse wavelength division multiplexer (CWDM) 4, 100GE-SR4, and so on.

In this example of FIG. 3A, KR FEC is used to encode symbols within forward error correction frames. KR FEC is a weak Reed-Soloman FEC. Further, this example does not require premium optics and is more cost effective, as compared to other types of 100GE modules, for example because of the lower output power and lower sensitivity of detectors used in the example computing system of FIG. 3A. Optical transceiver modules 32A-32B comprise second generation technology for a 100GE interface. Calculation parameters need to be changed because a weak FEC used rather than a strong FEC. For example, KR FEC can correct up to 7 bit-errors in a frame and KP FEC can correct up to 15 bit-errors in a frame.

Figure 3B:
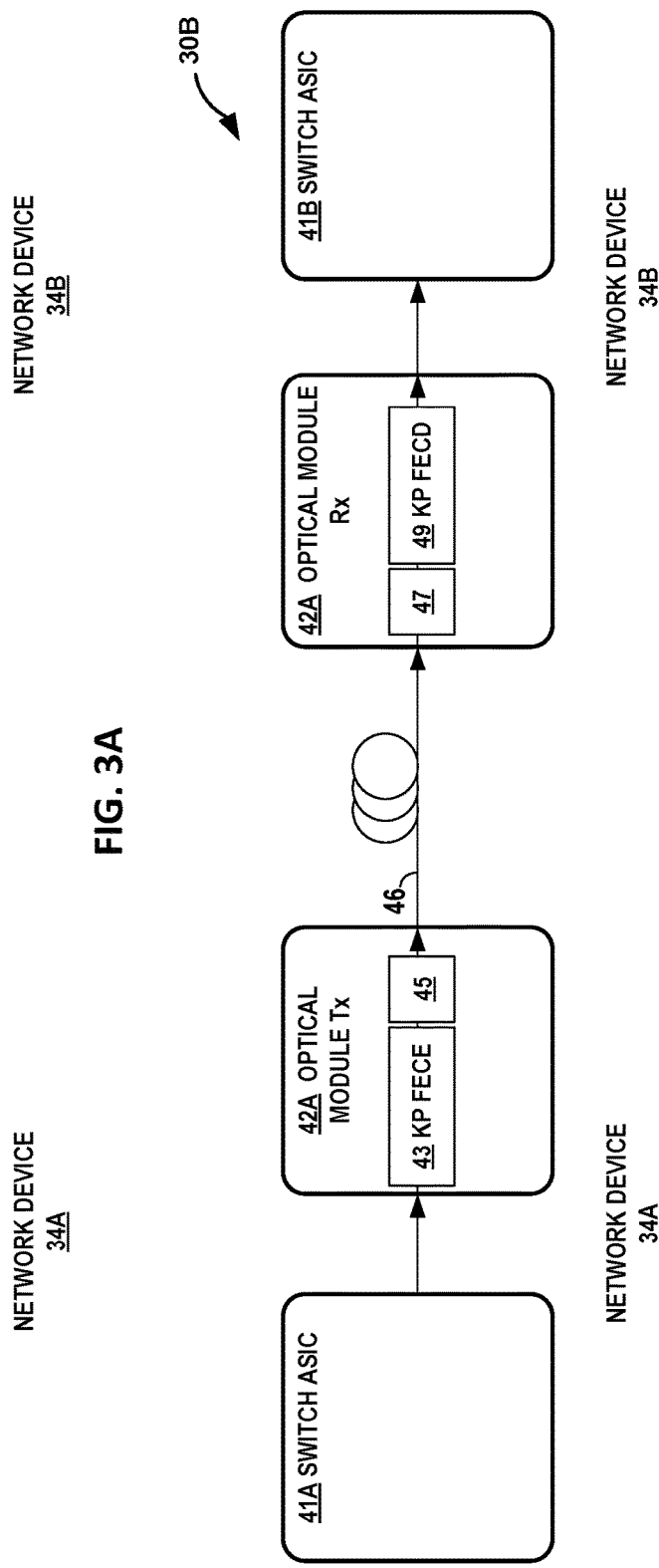
FIG. 3B is a block diagram illustrating another example network device including one or more switch ASICs and one or more optical transceiver modules, in accordance with one or more techniques of the disclosure.

FIG. 3B is a block diagram illustrating one example of a computing system with a forward error correction (FEC) encoder and an FEC decoder within respective optical transceiver modules. Here, KP FEC is used rather than KR FEC, as is used in computing system 30A. KP FEC is a strong Reed-Soloman FEC. Network device 34A includes switch ASIC 41A and optical transceiver module 42A, which includes KP FECE 43 and an optical signal 45. Network device 34B includes switch ASIC 41B and optical transceiver module 42B, which includes an optical signal receiver 47 and a KP FECD 49.

Here, unlike in FIG. 3A, FEC encoding and decoding occur within the optical transceiver modules 42A-42B. In addition, switch ASICs 41A-41B may be substantially similar to switch ASICs 31A-31B for backward compatibility. The digital signal path of FIG. 3B includes switch ASIC 41A transmitting an electrical signal to an electrical signal receiver (not shown) of the optical transceiver module 42A. KP FECE 43 encodes a FEC frame and concatenates it to the electrical signal. Optical transceiver module 42A converts the electrical signal, including the encoded FEC frame, to an optical signal and optical transmitter 45 transmits the optical signal, over the optical channel 46, to optical receiver 46 of optical transceiver module receiver 42B. Optical transceiver module 42B converts the optical signal to an electrical signal. KP FECD decodes the encoded FEC frame and transmits the decoded electrical signal to switch ASIC 41B. In an example, optical transceiver modules 42A-42B may be a 100 GE Single Lambda, etc. In one example of FIG. 3B, switch ASICs 31A-31B may include KR FECE and KR FECD, respectively.

FIG. 3C is a block diagram illustrating one example of a computing system with an FEC encoder and an FEC decoder within respective switch ASICs. Computing system 30C similar to the computing system 30A of FIG. 3A, however, switch ASICs 51A-51B comprise KP FECE 53 and KP FECD 59, respectively, rather than KR FECE 33 and KR FECD 39. KP FEC is a strong Reed-Solomon FEC. Optical transceiver modules 52A-52B may be a 400GE non-coherent interface.

An electrical signal is transmitted from switch ASIC 51A, where KP FECE 53 encodes the electrical signal with a FEC frame, to optical transceiver module 52A. From there, optical transmitter 55 transmits an optical signal, converted from the electrical signal by the optical transceiver module 52A, over optical channel 56, to an optical receiver 57 of optical transceiver module 52B. Optical transceiver module 52B converts the optical signal to an electrical signal destined for switch ASIC 51B, where KP FECD 59 decodes the FEC frame.

FIG. 3D is a block diagram illustrating one example of a computing system with a forward error correction (FEC) encoder and an FEC decoder within respective switch ASICs. FIG. 3D includes a system 30D that includes network devices 34A-34B. Unlike FIGS. 3A-C, each of network devices 34A-34B include either or both of a FECE and FECD within the switch ASICs 61A-61B and optical transceiver modules 62A-62B.

An electrical signal is transmitted, after KP FECE 63A encodes an FEC frame, from switch ASIC 61A, to optical transceiver module 62A. There, KP FECD 64A decodes the encoded FEC frame and CFECE 68A encodes the decoded FEC frame. An optical transmitter 65 transmits the encoded optical signal over a fiber connect-cross 66 to an optical receiver 67 of optical transceiver module 62B, where CFECD 68B decodes the optical signal. The digital signal is then encoded with an FEC frame by KP FECE 64B. The encoded electrical signal is then transmitted to switch ASIC 61B for decoding by KP FECD 63B.

Coherent FEC (including CFEC, OFEC, proprietary SDFEC) are suitable for coherent signals going through long distance cables, whereas KP FEC is suitable for shorter distances. KP FEC can be used between a host (e.g., switch ASICs 61A-61B) and optical transceiver modules 62A-62B. Within optical transceiver modules 62A-62B, KP FEC is stripped away and replaced with coherent FEC encoding/decoding. KP FEC encoding/decoding is in place to provide backward combability. Short-reach optics use KP FEC in ASIC switches 61A-61B and, currently, there is no desire in industry to develop a new ASIC for coherent modules. As seen in FIG. 3D, switch ASICs 61A-61B are the same for both non-coherent modules and coherent modules with this design. The optical transceiver modules 62A-62B includes second generation technology for 400GE interfacing. In one example of FIG. 3D, techniques described herein may apply to KP FECE/D sections.

Figure 4:
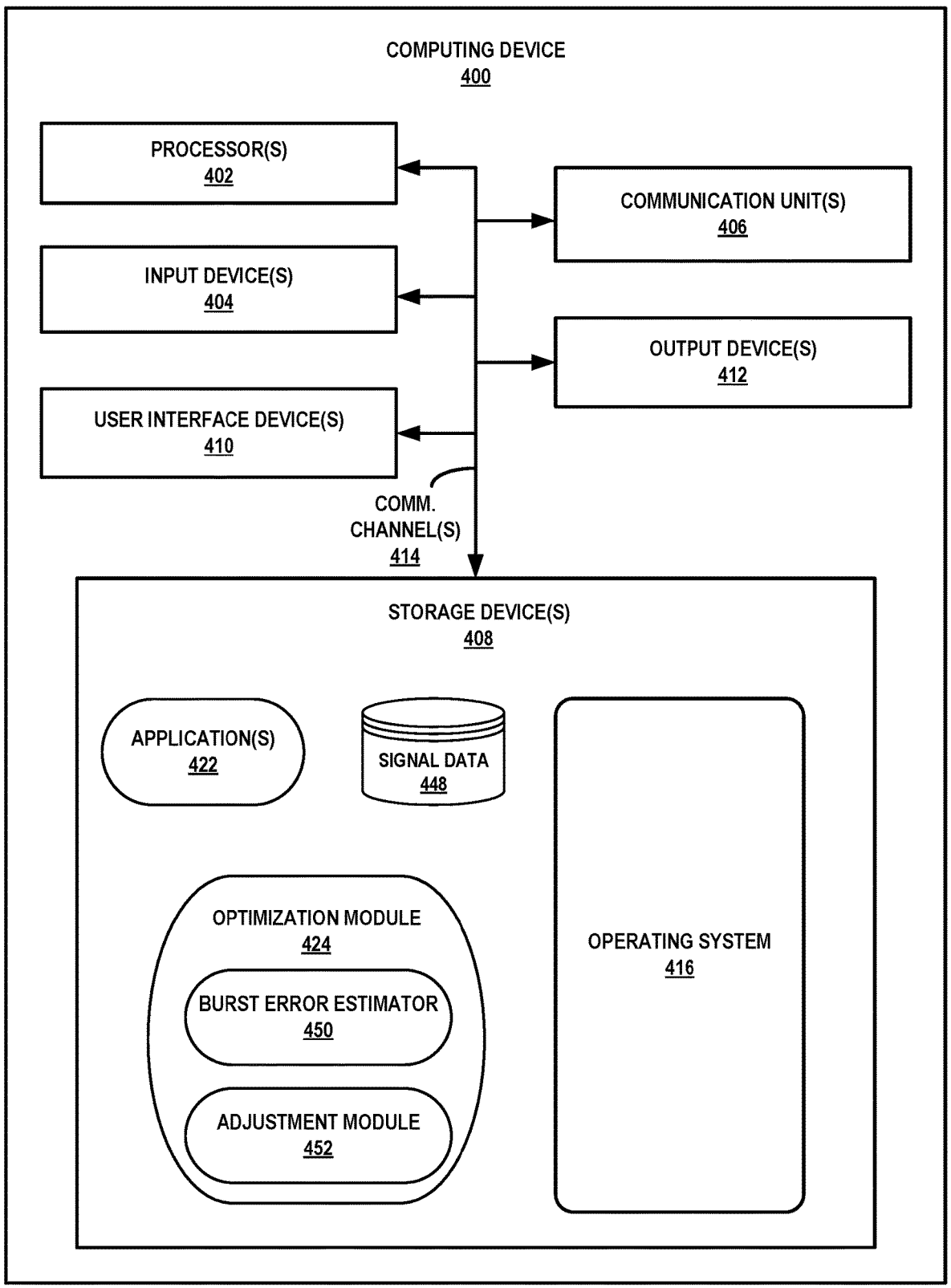
FIG. 4 is a block diagram illustrating further details of one example of a computing device that operates in accordance with one or more techniques of the present disclosure.

FIG. 4 is a block diagram illustrating further details of one example of a computing device that operates in accordance with one or more techniques of the present disclosure. FIG. 4 may illustrate a particular example of a server or other computing device 400 that includes one or more processor(s) 402 for executing any one or more of PNP 3 or any other computing device described herein. Other examples of computing device 400 may be used in other instances. Although shown in FIG. 4 as a stand-alone computing device 400 for purposes of example, a computing device may be any component or system that includes one or more processors or other suitable computing environment for executing software instructions and, for example, need not necessarily include one or more elements shown in FIG. 4 (e.g., communication units 406; and in some examples components such as storage device(s) 408 may not be co-located or in the same chassis as other components).

As shown in the specific example of FIG. 4, computing device 400 includes one or more processors 402, one or more input devices 404, one or more communication units 406, one or more output devices 412, one or more storage devices 408, and user interface (UI) device 410, and communication unit 406. Computing device 400, in one example, further includes one or more applications 422, optimization module 424, and operating system 416 that are executable by computing device 400. Optimization module 424 may be implemented using one or more computer processes. Each of components 402, 404, 406, 408, 410, and 412 are coupled (physically, communicatively, and/or operatively) for inter-component communications. In some examples, communication channels 414 may include a system bus, a network connection, an inter-process communication data structure, or any other method for communicating data. As one example, components 402, 404, 406, 408, 410, and 412 may be coupled by one or more communication channels 414.

Processors 402, in one example, are configured to implement functionality and/or process instructions for execution within computing device 400. For example, processors 402 may be capable of processing instructions stored in storage device 408. Examples of processors 402 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 400 during operation. Storage device 408, in some examples, is described as a computer-readable storage medium. In some examples, storage device 408 is a temporary memory, meaning that a primary purpose of storage device 408 is not long-term storage. Storage device 408, in some examples, is described as a volatile memory, meaning that storage device 408 does not maintain stored contents when the computer is turned off. Examples of volatile memories include random access memories (RAM), dynamic random-access memories (DRAM), static random-access memories (SRAM), and other forms of volatile memories known in the art. In some examples, storage device 408 is used to store program instructions for execution by processors 402. Storage device 408, in one example, is used by software or applications running on computing device 400 to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 408 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication units 406. Computing device 400, in one example, utilizes communication units 406 to communicate with external devices via one or more networks, such as one or more wired/wireless/mobile networks. Communication units 406 may include a network interface card, such as an Ethernet card, an optical transceiver, a radio frequency transceiver, or any other type of device that can send and receive information. Other examples of such network interfaces may include 3G and WiFi radios. In some examples, computing device 400 uses communication unit 406 to communicate with an external device.

Computing device 400, in one example, also includes one or more user interface devices 410. User interface devices 410, in some examples, are configured to receive input from a user through tactile, audio, or video feedback. Examples of user interface devices(s) 410 include a presence-sensitive display, a mouse, a keyboard, a voice responsive system, video camera, microphone or any other type of device for detecting a command from a user. In some examples, a presence-sensitive display includes a touch-sensitive screen.

One or more output devices 412 may also be included in computing device 400. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker, a cathode ray tube (CRT) monitor, a liquid crystal display (LCD), or any other type of device that can generate intelligible output to a user.

Computing device 400 may include operating system 416. Operating system 416, in some examples, controls the operation of components of computing device 400. For example, operating system 416, in one example, facilitates the communication of one or more applications 422 and optimization module 424 (e.g., optimization module 13) with processors 402, communication unit 406, storage device 408, input device 404, user interface devices 410, and output device 412.

Application 422 and optimization module 424 may also include program instructions and/or data that are executable by computing device 400. Example optimization module 424 executable by computing device 400 in the illustrated architecture includes burst error estimator 450 and adjustment module 452.

Optimization module 424 may include instructions for causing computing device 400 to perform one or more of the operations and actions described in the present disclosure with respect to optical controller 18 and optical module 15. For example, the error data 17 may be one of symbol errors within an FEC frame, BER BIP in an alignment marker, and so on. Burst error estimator 450 may include instructions for computing, upon analyzing signal data obtained by optical module 15, a distribution of errors within the signal data 448

(which may be a repository for obtained error data 17), and then comparing the distribution of errors to an expected distribution of errors. For example, burst error estimator 450 may generate a distribution of symbol error for a FEC frame and then compare that to an expected distribution of symbol errors, as discussed with reference to equations (1)-(8). Burst error estimator 450 may generate a distribution of bit errors of the BIP field and then compare that to an expected error distribution, as discussed with reference to equations (1)-(8).

Further, burst error estimator 450 may include instructions for determining, based on the comparison, whether at least one burst error exists within the signal data. Adjustment module 452 may include instructions for generating optical channel configuration data (e.g., optical channel configuration data 19) for optimization module 424 to transmit to optical module 15. For example, the optical channel configuration data 19 generated by the adjustment data may be based on the determination by the burst error estimator 450. The optical channel configuration data 19 may include an adjustment level for the signal amplitude, and pre- and post-cursor signal adjustments.

Figure 5:
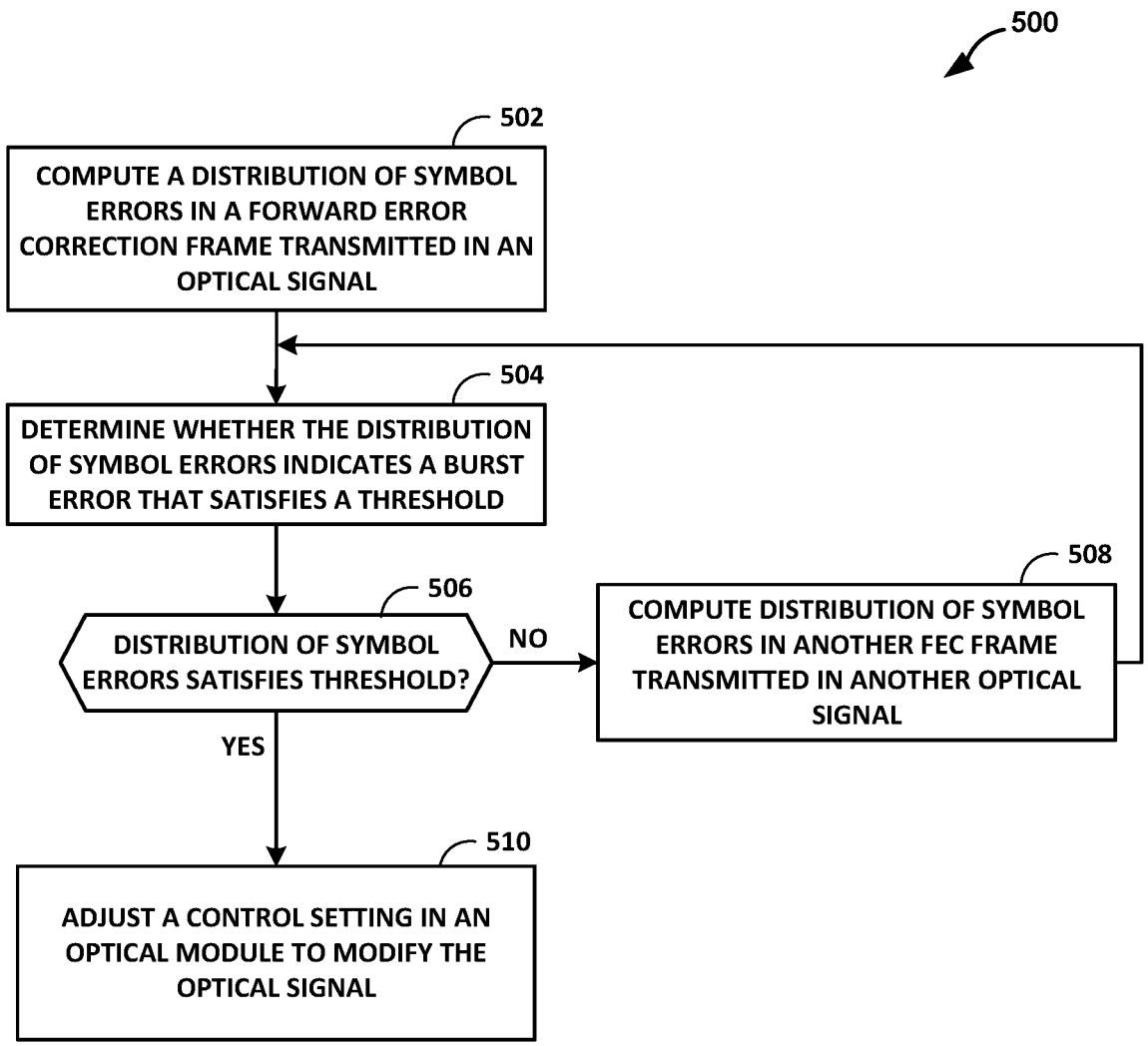
FIG. 5 is a flowchart of an example mode of operation for a computing system, in accordance with one or more techniques of the disclosure.

FIG. 5 is a flowchart illustrating a method 500 for determining whether an optical signal includes a burst error, in accordance with one or more techniques of the disclosure. Method 500 includes computing, by optimization module 13, a distribution of symbol errors in a forward error correction (FEC) frame transmitted in an optical signal (502). In one example of block 502, optimization module 13 obtains an FEC frame from an optical signal and then transmits the obtained FEC frame to an optimization module 13, which computes the distribution of symbol errors in the obtained FEC frame. In one example of block 502, a receiver optical module (e.g., 22B) transmits error data 17 that includes symbol errors within the FEC frame to an optimization module 13. In one example of block 502, a burst error estimator 450 within the optimization module 13 computes the distribution of symbol errors in the FEC frame.

Optimization module 13 determines whether the distribution of symbol errors indicates a burst error that satisfies a threshold (504). In one example of block 504, optimization module 13 compares the computed distribution of symbol errors to an expected distribution of symbol errors (e.g., based on a Poisson distribution, as discussed above with reference to equations (1)-(8)). Optimization module 13 determines whether the distribution of symbol errors satisfies a threshold (506). In one example of block 506, optimization module 13 may perform a curve fitting of the computed distribution of symbol errors and then compare the curve fitting to an expected distribution of symbol errors, as discussed above. If the determination at block 506 does not satisfy the threshold (NO branch of 506), optimization module 13 computes a distribution of symbol errors in another FEC frame transmitted in another optical signal (508).

However, if the determination satisfies the threshold (YES branch of 506), optimization module 13 may adjust one or more of a pre-cursor setting, post-cursor setting, and a signal amplitude for the optical signal (510). In one example of block 510, adjustment module 452 generates optical channel configuration data 19 based on the indication of burst errors within the optical signal. Optimization module 13 transmits optical channel configuration data 19 to optical module, which includes settings for adjusting a control setting in the optical module 15 to modify the optical signal. For example, the control setting can be one of the pre-cursor, post-cursor, or signal amplitude of the optical signal. For example, optical module 15 uses the optical channel configuration data 19 to adjust one of a pre-cursor setting, post-cursor setting, and a signal amplitude for the optical signal. Alternatively, or in addition to, the optimization module 13 may use a feedback mechanism to change one of a continuous time-domain equalizer (CTLE), decision feedback equalizer (DFE), reflection canceller (RC), slicer, and level-dependent equalizer (LDEQ), and so on.

Figure 6:
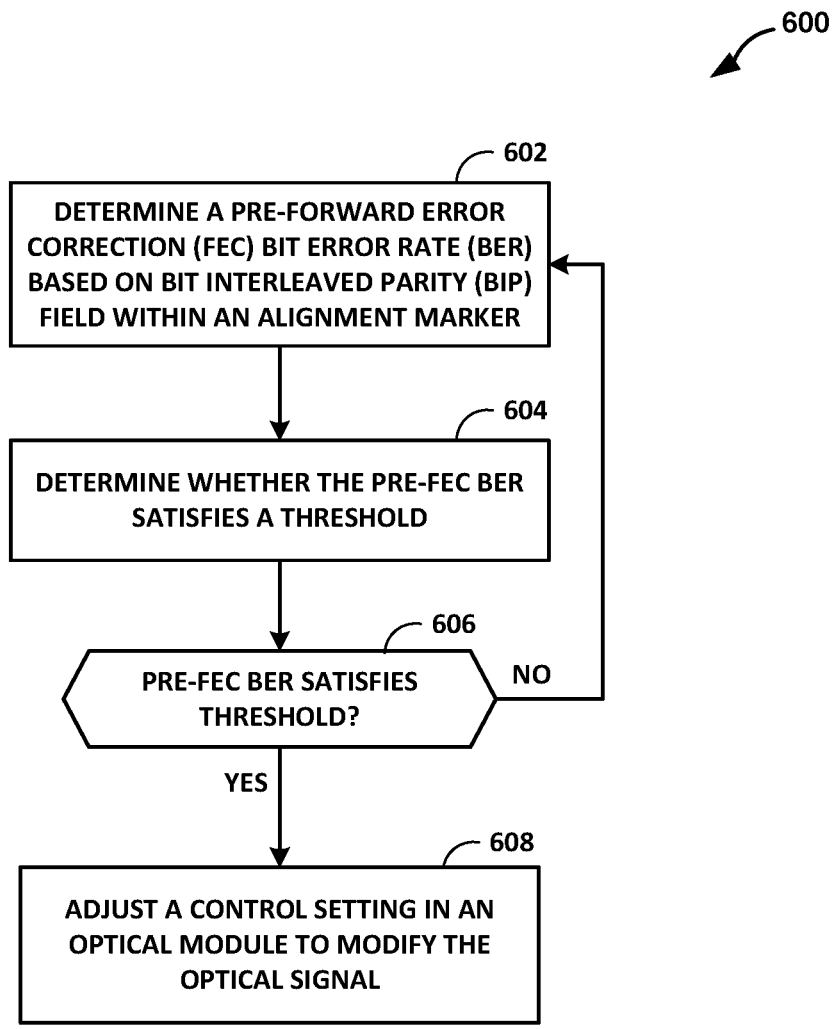
FIG. 6 is a flowchart of another example mode of operation for a computing system, in accordance with one or more techniques of the disclosure.

FIG. 6 is a flowchart illustrating a method 600 for determining whether an optical signal includes a burst error, in accordance with one or more techniques of the disclosure. Method 600 may include determining a pre-forward error correction (FEC) bit error rate (BER) based on a bit interleaved parity (BIP) field within an alignment marker (602). For example, the system may insert alignment markers within at least one of a physical coding sublayer (PCS). Further, a BIP check may be added for each of the PCS lanes and may be carried in the alignment markers. In one example, optical module 15 may obtain a pre-FEC BER and generate error data 17 that includes the pre-FEC BER destined for the optimization module 13.

Method 600 may further include determining whether the pre-FEC BER satisfies a threshold (604). In one example of step 604, the computing system may estimate the pre-FEC BER based on a random distribution (such as a Poisson distribution, as discussed above). The computing system may then compare the estimated BER distribution to the determined pre-FEC BER distribution and, if the determined amount is equal to or greater than the estimated BER, the computing system may determine a threshold is satisfied (606). If the computing system determines the threshold is satisfied (YES branch of 606), method 600 may continue with the computing system adjusting a control setting in an optical module to modify an optical signal (608). For example, the control setting may be one or more of a pre-cursor setting, post-cursor setting, or a signal amplitude for the optical signal. In one example of step 608, a feedback mechanism is used to change one of a continuous time-domain equalizer (CTLE), decision feedback equalizer (DFE), reflection canceller (RC), slicer, and level-dependent equalizer (LDEQ), and so on. However, if the computing system determines the threshold is not satisfied (NO branch of 606), method 600 may return to block 602.

Figure 7:
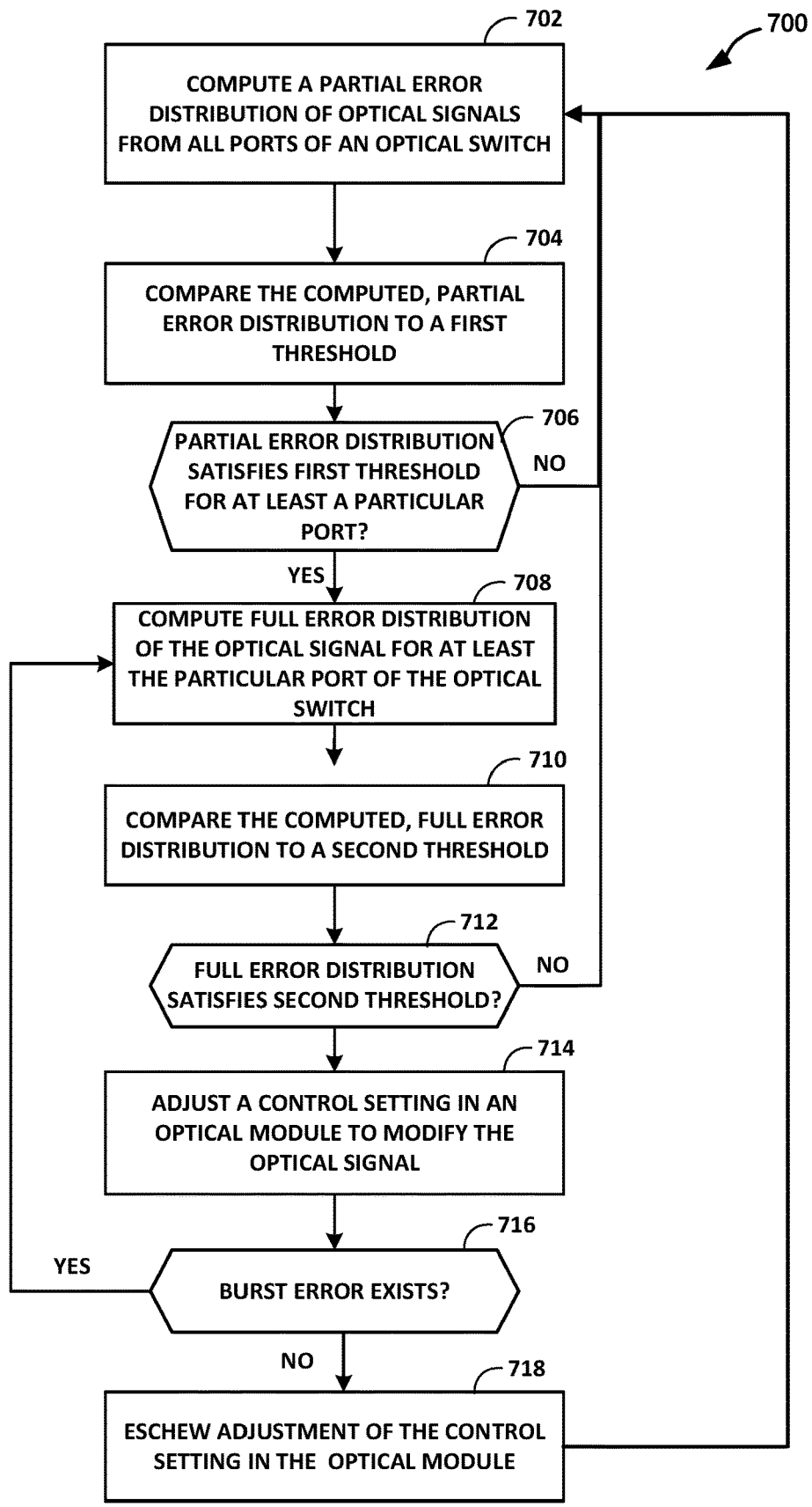
FIG. 7 is a flowchart of yet another example mode of operation for a computing system, in accordance with one or more techniques of the disclosure.

FIG. 7 is a flowchart illustrating a method 700 for determining whether an optical signal includes a burst error, in accordance with one or more techniques of the disclosure. Method 700 includes computing, by the optimization module 13, a partial error distribution of optical signals from all ports of a network device (e.g., network devices, 12A-12B, 34A-34B) (702). For example, the network device may include at least a optical transceiver module (e.g., optical transceiver modules 15, 22A-22B, 32A-32B, 42A-42B, 52A-52B, 62A-62B) and a switch ASIC (e.g., switch ASIC 26A-26B, 31A-31B, 41A-41B, 51A-51B, 61A-61B). In one example of block 702, the partial error distribution of optical signals may be for a set amount of time. In one example of block 702, the distribution of optical signals may include a distribution of symbol errors, as discussed in FIG. 5, a distribution of pre-FEC bit errors, as discussed in FIG. 6, or both. Method 700 may include comparing the computed, partial error distribution of optical signals from all ports of the network device to a first threshold (704). In one example of block 704, the first threshold may be the expected distribution of symbol errors within a FEC frame, the expected distribution of pre-FEC bit errors, and so on.

Method 700 may include determining whether a partial error distribution of at least a particular port of all the ports of the network device satisfies the first threshold (706). If the first threshold is satisfied (YES branch of 706), method 700 may continue with computing a full error distribution for the particular port of the network device (708). In one example of block 708, the full error distribution is for a set amount of time that is longer than for the partial error distribution. However, if the computing system determines the first threshold is not satisfied (NO branch of 706), method 700 may return to block 702.

Method 700 further may include comparing the computed, full error distribution to a second threshold (710). Method 700 may include determining whether the computed, full error distribution satisfies a second threshold (712). If the full error distribution does not satisfy the second threshold (NO branch 712), method 700 returns to block 702. However, if the full, computed error distribution satisfies the second threshold (YES branch 712), method 700 may adjust a control setting in an optical module to modify the optical signal (714). For example, the control setting may be one or more of a pre-cursor setting, post-cursor setting, or a signal amplitude for the optical signal. In one example of step 714, a feedback mechanism is used to change one of a continuous time-domain equalizer (CTLE), decision feedback equalizer (DFE), reflection canceller (RC), slicer, and level-dependent equalizer (LDEQ), and so on.

Method 700 may further include determining whether a burst error exists (716). If the computing system determines a burst error exists (YES branch of 716), method 700 may return to block 708. However, if a burst error does not exist (NO branch of 716), method 700 may eschew adjustment of the control setting in the optical module (718).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
    computing, by a computing system, a distribution of symbol errors in a forward error correction (FEC) frame transmitted in an optical signal;
    comparing the distribution of symbol errors in the FEC frame to an expected, Poisson distribution of symbol errors;
    determining, based on the comparison, that the distribution of symbol errors indicates a burst error that satisfies a threshold; and
    in response to determining that the distribution of symbol errors indicates the burst error that satisfies the threshold, adjusting a control setting in an optical transceiver module to modify the optical signal.

2. The method of claim 1,
    wherein the computing system comprises a receiver optical transceiver module that receives the optical signal, and
    wherein computing the distribution of symbol errors in the FEC frame comprises:
    obtaining, by the receiver optical transceiver module, the FEC frame from the optical signal; and
    computing, by the receiver optical transceiver module, the distribution of symbol errors in the FEC frame.

3. The method of claim 1,
    wherein the threshold comprises a second threshold,
    wherein computing the distribution of symbol errors in the FEC frame transmitted in an optical signal further comprises computing, by the computing system, a partial distribution of symbol errors in the FEC frame from a plurality of ports of a network device,
    wherein determining that the distribution of symbol errors indicates a burst error that satisfies the threshold comprises determining that the partial distribution of symbol errors satisfies a first threshold at a particular port of the network device, the method further comprising:
    computing, by the computing system, a full distribution of symbol errors of the optical signal for at least the particular port of the network device,
    wherein the adjusting, in an optical transceiver module, the control setting in the optical transceiver module to modify the optical signal is in response to determining that the computed, full distribution of symbol errors indicates the burst error satisfies the second threshold.

4. The method of claim 1, further comprising:
    obtaining, by a receiver optical transceiver module of a network device, the FEC frame from the optical signal; and
    sending the FEC frame from the network device to the computing system.

5. The method of claim 1, wherein computing the distribution of symbol errors in the FEC frame comprises obtaining FEC codewords with varying numbers of errors.

6. The method of claim 1, further comprising: collecting the optical signal for a predetermined time interval.

7. The method of claim 1, further comprising:
determining, by comparing quantity of indicated burst errors within at least the optical signal satisfies a burst error threshold; and
in response to determining the burst error threshold is satisfied, generating an alarm.

8. The method of claim 1, wherein the FEC frame comprises a first FEC frame, the method further comprising:
computing, by the computing system, after the adjusting, a distribution of symbol errors in a second FEC frame transmitted in the optical signal; and
in response to determining that the distribution of symbol errors in the second FEC frame does not indicate a burst error that satisfies the threshold, eschewing adjustment, in the optical transceiver module, of the control setting in the optical transceiver module to modify the optical signal.

9. The method of claim 1, wherein the control setting in the optical transceiver module comprises one or more of a pre-cursor setting, a post-cursor setting, or a signal amplitude for the optical signal.

10. A method comprising:
determining, by a computing system, a pre-forward error correction (FEC) bit error rate (BER) based on a bit interleaved parity (BIP) field within an alignment marker of an electrical signal; and
in response to determining that the pre-FEC BER based on the BIP field exceeds an estimated BER, adjusting, in an optical transceiver module, a signal amplitude for the electrical signal through the optical channel.

11. The method of claim 10, wherein determining the pre-FEC BER based on the BIP field within an alignment marker of the electrical signal is prior to transmission through an optical channel.

12. The method of claim 10, wherein determining that the pre-FEC BER exceeds the estimated BER further comprises:
estimating a BER of an FEC frame based on a random distribution; and
comparing the estimated BER to the determined pre-FEC BER.

13. The method of claim 10, further comprising:
determining, by comparing a quantity of indicated burst errors within at least the optical signal, the quantity of indicated burst errors satisfies a burst error threshold; and
in response to determining the burst error threshold is satisfied, generating an alarm.

14. The method of claim 12, wherein the estimating a BER of a FEC frame based on a random distribution further comprises:
performing a curve fitting on a first set of data in the random distribution; and minimizing an error of the curve fitting according to:

$$Err_{fit} = \sum_{x=0}^{x=l}\left[\frac{\text{Pr\_theo}(x) - \text{Pr\_meas}(x)}{\text{Pr\_meas}(x)}\right]^2.$$

15. A computing system comprising:
processing circuitry having access to a memory device, the processing circuitry configured to:
compute a distribution of symbol errors in a forward error correction (FEC) frame transmitted in an optical signal;
compare the distribution of symbol errors in the FEC frame to an expected, Poisson distribution of symbol errors;
determine, based on the comparison, that the distribution of symbol errors indicates a burst error that satisfies a threshold; and
in response to determining that the distribution of symbol errors indicates the burst error that satisfies the threshold, adjust, in an optical transceiver module, a control setting in an optical transceiver module to modify the optical signal.

16. The computing system of claim 15, wherein the computing system further comprises a receiver optical transceiver module that receives the optical signal, and
wherein to compute the distribution of symbol errors in the FEC frame the receiver optical transceiver module includes the processing circuitry configured to:
obtain the FEC frame from the optical signal; and
compute the distribution of symbol errors in the FEC frame.

17. The computing system of claim 15, wherein the processing circuitry is further configured to:
determine, by comparing quantity of indicated burst errors within at least the optical signal satisfies a burst error threshold; and
in response to determining the burst error threshold is satisfied, generate an alarm.

18. The computing system of claim 15, wherein the FEC frame comprises a first FEC frame, wherein the processing circuitry is further configured to:
compute, after the adjusting, a distribution of symbol errors in a second forward error correction (FEC) frame transmitted in the optical signal; and
in response to determining that the distribution of symbol errors in the second FEC frame does not indicate a burst error that satisfies the threshold, eschew adjustment, in the optical transceiver module, the control setting in the optical transceiver module to modify the optical signal.

19. The computing system of claim 15, wherein the control setting in the optical transceiver module comprises one or more of a pre-cursor setting, a post-cursor setting, or a signal amplitude for the optical signal.

* * * * *